L. HOSKINS.
VEHICLE WHEEL.
APPLICATION FILED JAN. 10, 1913.

1,115,199.

Patented Oct. 27, 1914.
4 SHEETS—SHEET 1.

L. HOSKINS.
VEHICLE WHEEL.
APPLICATION FILED JAN. 10, 1913.
1,115,199.
Patented Oct. 27, 1914.
4 SHEETS—SHEET 3.
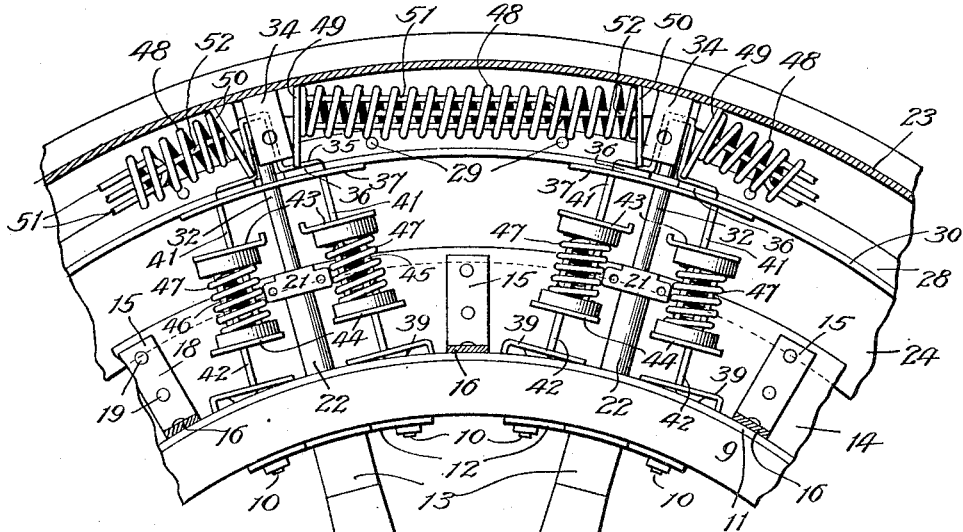
Fig. 3.
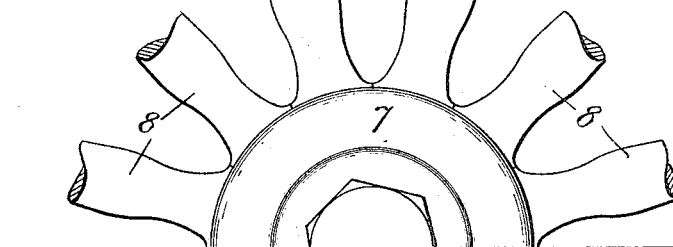
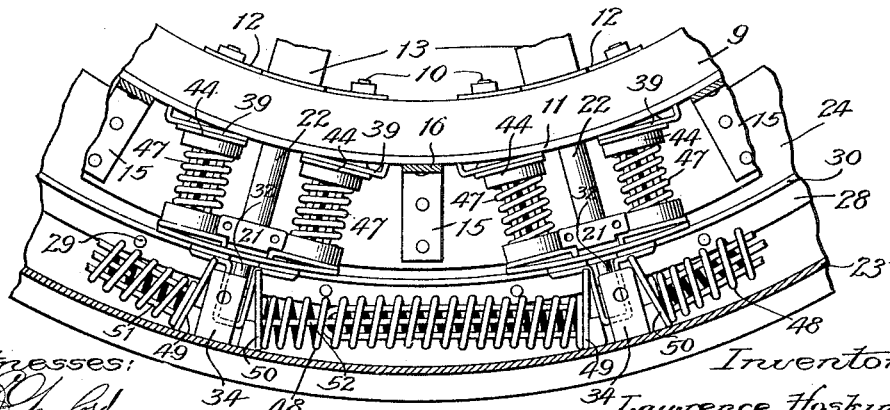
Witnesses:
Inventor:
Lawrence Hoskins,
By Dyrenforth, Lee, Chritton & Wiles,
Attys.

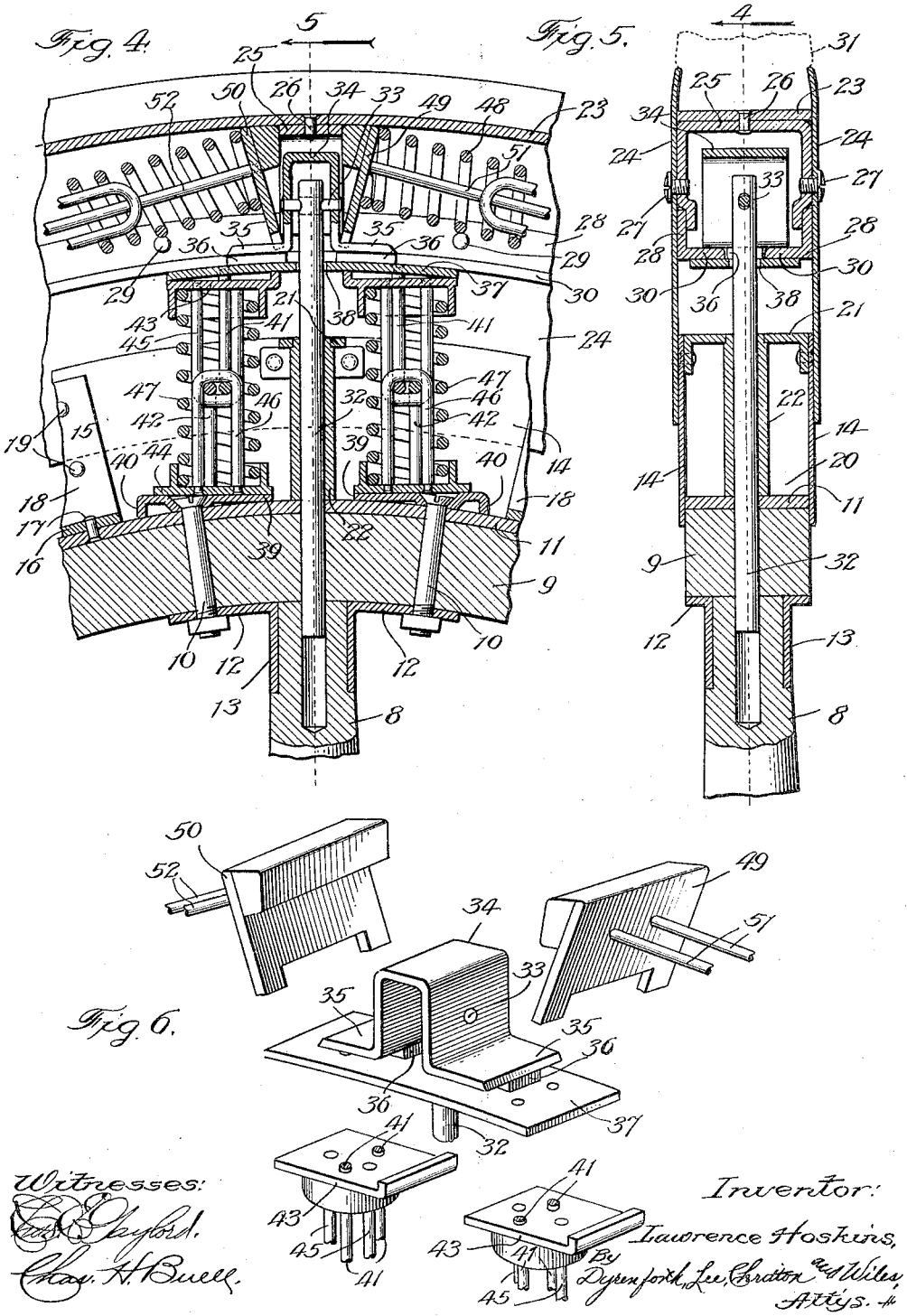

UNITED STATES PATENT OFFICE.

LAWRENCE HOSKINS, OF PLAINVILLE, ILLINOIS.

VEHICLE-WHEEL.

1,115,199.  Specification of Letters Patent.  Patented Oct. 27, 1914.

Application filed January 10, 1913. Serial No. 741,190.

*To all whom it may concern:*

Be it known that I, LAWRENCE HOSKINS, a citizen of the United States, residing at Plainville, in the county of Adams and State of Illinois, have invented a new and useful Improvement in Vehicle-Wheels, of which the following is a specification.

My invention relates to improvements in wheels of the type in which the hub-portion thereof is yieldingly supported on the rim of the wheel through the medium of springs for rendering the wheel resilient.

My primary object is to provide a simple and economical construction of wheel of the type above referred to, which shall be sufficiently sensitive in its action to absorb shocks in passing over rough roads, be rigid and durable, and present the advantages, without the disadvantages, of pneumatic-tired wheels.

Figure 1:
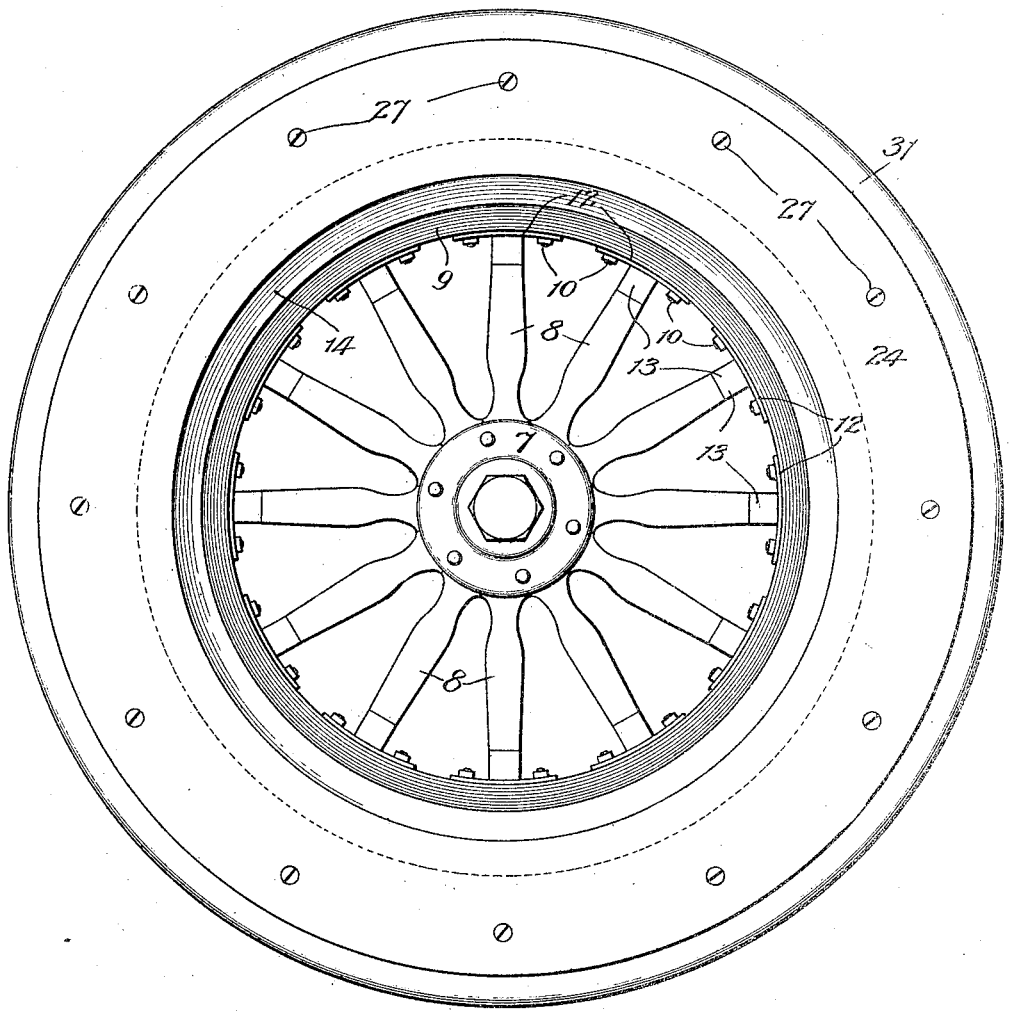
Figure 2:
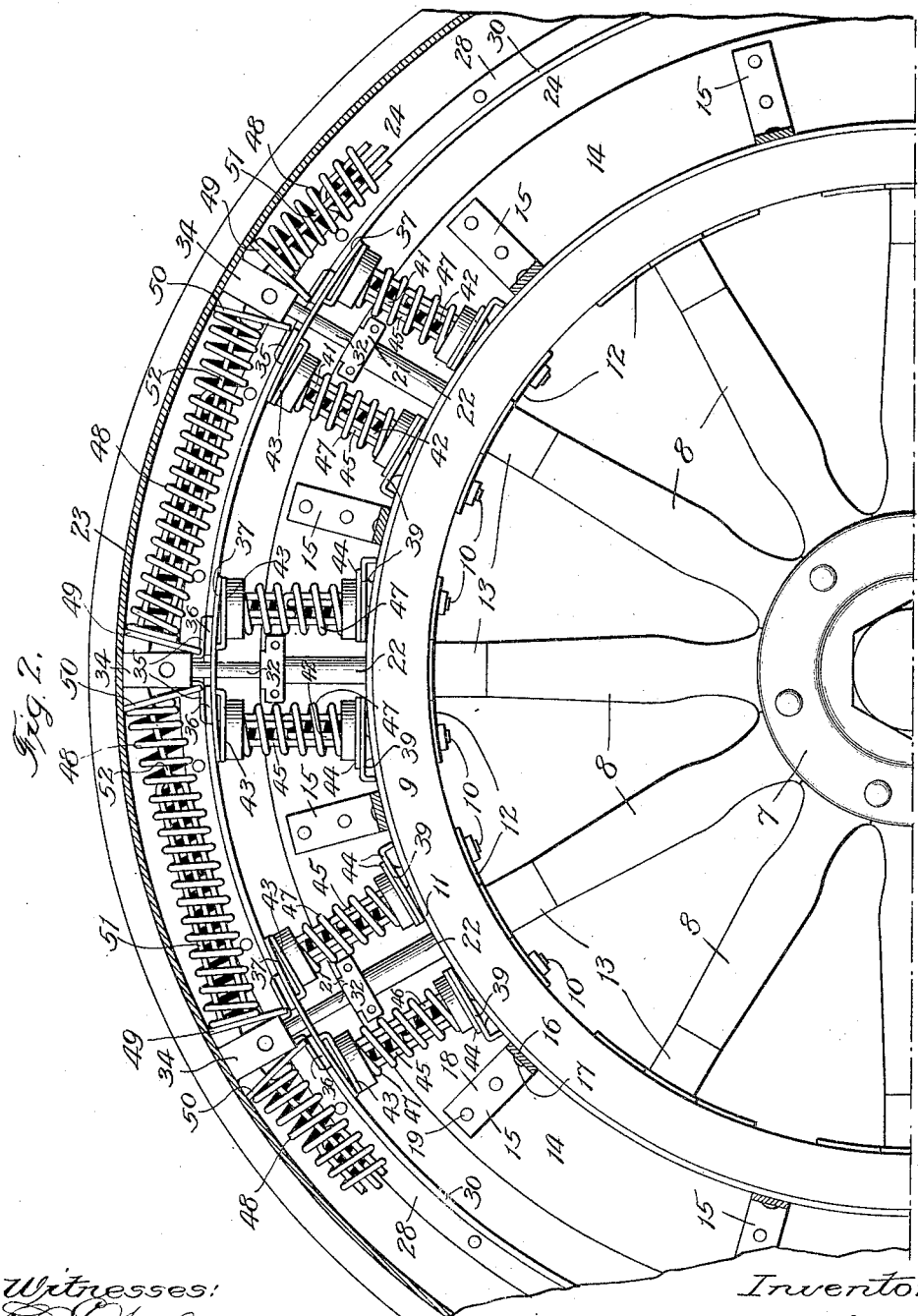

Referring to the accompanying drawings Figure 1 is a view in side elevation of a wheel constructed in accordance with my invention. Fig. 2 is an enlarged view similar to that of Fig. 1, showing substantially one half of the wheel, one of the side-plates thereof being removed to show the details of the interior mechanism of the wheel, certain portions of which mechanism are omitted. Fig. 3 is a view similar to Fig. 2 showing the upper and lower portions of the wheel and illustrating the operation of the upper and lower radial spring means thereof when the wheel is in use. Fig. 4 is a section taken at the line 4 on Fig. 5 and viewed in the direction of the arrow. Fig. 5 is a section taken at the line 5 on Fig. 4 and viewed in the direction of the arrow; and Fig. 6, a perspective view of certain details of the mechanism which coöperates with the springs for producing the desired resilient action.

The hub of the wheel is represented at 7 and is provided with spokes 8, carrying at their outer ends a ring 9, which is preferably secured to the spokes through the medium of bolts 10 which pass through a band 11 surrounding the ring 9 and through plate-extensions 12 on ferrules 13 surrounding the outer ends of the spokes 8. The ring 9 is provided with annular side-plates 14 which project beyond its periphery and are secured thereto through the medium of yokes 15 which are connected at their sections 16 with the ring 9 through the medium of rivets 17 and at their radially-extending legs 18 with the plates 14 at the inner sides of the latter through the medium of rivets 19, whereby the plates 14 are rigidly secured to the ring 9 and form with the band 11 a channel 20 about the periphery of the ring 9, as clearly represented in Fig. 5, the plates 14 being connected together at their peripheral edges by means of yokes 21, secured to the inner sides of the plates 14 and equipped with sleeves 22 which extend radially of the wheel center and in radial alinement with the spokes 8 as represented, it being preferred that one of these sleeves be provided for each spoke and that the yokes 21 carrying these sleeves alternate with the yokes 15.

The rim-portion of the wheel is preferably formed of an annular band 23 secured to spaced side-plates 24 as through the medium of yoke-shaped members 25 secured to the band 23, as indicated at 26, and to the side-plates 24 by screws, as indicated at 27, and rings 28 of angular shape in cross-section riveted, as indicated at 29, to the inner surfaces of the plates 24, to provide inwardly-extending flanges 30 opposing each other, but spaced apart as represented in Fig. 5, the plates 24 overlapping the plates 14 sufficiently far to insure overlapping relation of these parts at all times in the operation of the wheel, the plates 24 projecting peripherally beyond the band 23 to form a channel about the periphery of the wheel for receiving a rubber tire illustrated diagrammatically at 31.

It will be understood from the foregoing that the hub-portion of the wheel carrying the parts described and the rim portion thereof are separate structures, the one being guidedly confined on the other.

In order to provide for the desired resiliency in the wheel and to provide operative connection between the hub-portion and rim-portion thereof, a system of spring devices is employed of which the following is a description:

In carrying out my invention in the preferred manner, I provide a series of radial springs which are so constructed and arranged that the springs both above and below the center of the wheel are compressed when an impact is delivered against the wheel; and a series of circumferentially arranged springs which coöperate with the radially disposed springs in the action of the wheel.

The radially disposed spring-means above referred to are provided in a series between the periphery of the hub-portion of the wheel and the rim portion thereof, and as each of these spring means is the same, a description of one only thereof will suffice. Slidably confined in a sleeve 22 is a radially-extending reciprocable rod 32, extending at its outer end into, and secured as by a pin 33 to, a yoke-member 34 which normally lies within the adjacent one of the members 25. The inner ends of the yoke-member 34, which are extended circumferentially of the wheel, as indicated at 35, are located between the band 23 and the flanges 30, and overlap the latter as indicated in Fig. 5. Secured to the yoke-member 34 at its extensions 35 are spacers 36, which lie within the continuous slot provided between the flanges 30 and rigidly secured to the spacers 36 to overlap the flanges 30 at the inner peripheries of the latter, is a curved plate 37, through an opening 38 in which the rod 32 loosely extends, the part just described being so constructed and arranged that they have sliding engagement with the flanges 30 for a purpose which will be readily understood from the following. Secured by the bolts 10 to the ring 9 at opposite sides of the sleeves 22 are plates 39, these plates being flanged along an edge thereof, as indicated at 40, in order that they shall extend at right angles to the rod 32 adjacent thereto. The opposite ends of the plate 37 are provided with yoke-shaped members 41, which extend toward the center of the wheel and preferably parallel with the rod 32, and the opposing plates 39 are also equipped with yoke-members 42, which extend away from the center of the wheel and preferably parallel with the rod 32. Slidably confined on the side-sections of the yokes 41 and 42 are plates 43 and 44, respectively, these plates being provided with yoke-shaped members 45 and 46, which extend toward and away from the center of the wheel, respectively, and arranged in parallel relation to each other, but at angles of approximately ninety degrees to the yokes 41 and 42, the yoke 42 interlocking with the yoke 45 and the yoke 41 interlocking with the yoke 46. A coiled spring 47 fits at its opposite ends in sockets provided on the opposed faces of the plates 43 and 44, and surrounds the interlocking yoke-members 41, 42, 45 and 46, these springs being preferably placed in the wheel under expansion tension whereby they will serve to normally hold the plates 43 and 44, against the plates 37 and 39, respectively, as represented in Fig. 4. It will thus be readily understood that when the central hub-portion of the wheel, when the latter is in use, descends relative to the rim portion thereof, the interlocking yoke-members 41, 42, 45 and 46, will operate above the center of the wheel to draw the plates 43 and 44 toward each other and thus compress the springs 47 coöperating therewith, whereas, as to the springs below the center of the wheel, the plates 37 and 39 will be drawn toward each other and consequently compress the springs below the center of the wheel as illustrated in Fig. 3.

In the movement of the center portion of the wheel downwardly, as described, the main resistance afforded to such movement is produced by those of the springs 47 which are at the uppermost and lowermost portions of the wheel, the intermediate springs supplementing this action to a degree depending on how close they are to the upper or lower part of the wheel. It is desirable, however, that other spring means be provided in the wheel which will coöperate with the spring-mechanism just described in a line at substantially right angles to those of the radially disposed springs which produce the most effective resistance, and to this end I provide the series of circumferentially-disposed springs hereinbefore referred to and which coöperate with the central, or hub, section of the wheel, or to be more specific, with the yokes 34, which by being substantially rigid with the rods 32 form a part of the hub-portion of the wheel. These circumferentially-disposed springs are represented at 48 and are shown as located between the ring 23 and the flanges 30, and are confined under expansion tension against plates 49 and 50, arranged in pairs and located between adjacent ones of the yoke-members 25 and bearing against the latter as represented in Fig. 2, the plates 49 and 50 preferably carrying yoke-members 51 and 52, respectively, arranged at angles to each other as represented in Fig. 2 and serving to hold the springs 48 against buckling when compressed under the action of the wheel in use.

It will be understood from the foregoing that when any pressure is brought to bear on the hub-portion of the wheel, tending to depress it, such force will not only be yieldingly resisted by the radial springs 47, but will also be resisted by the springs 48, owing to the depression of the central portion of the wheel, which will cause the yoke-members 34 to depress and bear against the adjacent ones of the plates 49 below them, the plates at the opposite ends of these springs being held against movement by engaging with the yoke-members 25 below them, thus causing the springs 48 to become compressed, thereby aiding the radial springs in resiliently supporting the central portion of the wheel on the rim-portion thereof.

While I have illustrated and described the specific form in which I prefer to provide my invention, I do not wish to be understood as intending to limit it to such form, as the same may be variously modified and altered without departing from the spirit of my invention.

What I claim as new and desire to secure by Letters Patent is—

1. In a vehicle-wheel, the combination of a hub-section, a rim-section guidedly confined thereon, telescopic means mounted in one section and loosely mounted in the other to permit circumferential movement, radially-disposed springs located between said rim-section and hub-section, members engaging said springs at opposite ends of the latter, and means connecting those of said members which are positioned at the outer ends of said springs, with said hub-section and said members at the inner ends of said springs with said rim-section.

2. In a vehicle-wheel, the combination of a hub-section, a rim-section guidedly confined thereon, telescopic means mounted in one section and loosely mounted in the other to permit circumferential movement, radially-disposed springs located between said rim-section and hub-section, members engaging said springs at opposite ends of the latter, confined between, and overlapping parts of, said sections, and means connecting those of said members which are positioned at the outer ends of said springs with one of said sections, and said members at the inner ends of said springs with the other of said sections.

3. In a vehicle-wheel, the combination of a hub-section, a rim-section guidedly confined thereon, a telescopic member mounted in the hub-section and having its other end loosely mounted in the rim section adapted to permit circumferential movement, radially-disposed springs located between said rim-section and hub-section, members engaging said springs at opposite ends of the latter, and confined between, and overlapping parts of said sections, and interlocking yoke-shaped bars connecting those of said members which are positioned at the outer ends of said springs with one of said sections, and said members at the inner ends of said springs with the other of said sections.

4. In a vehicle-wheel, the combination of a hub-section, a rim-section guidedly confined thereon, a series of members confined on one of said sections but having movement circumferentially thereof, radially-disposed springs located between said members and the other of said sections, members engaging said springs at opposite ends of the latter and bearing against said first-named members and said last-referred to wheel-section, and means connecting those of said members which are positioned at an end of said springs with said first-named members, and those of said members which are positioned at the other end of said springs with said last-referred to wheel-section.

5. In a vehicle-wheel, the combination of a hub-section, a rim-section guidedly confined thereon, a series of members confined on said rim-section but having movement circumferentially thereof, radially-disposed springs located between said members and said hub-section, members engaging said springs at opposite ends of the latter and bearing against said first-named members and said hub-section, and means connecting those of said last-named members which are positioned at the outer ends of said springs, with said hub-section and said members at the inner ends of said springs with said first-named members.

LAWRENCE HOSKINS.

In presence of—
P. W. YOUNG,
G. W. WILLFORD.

---

Copies of this patent may be obtained for five cents each, by addressing the "Commissioner of Patents, Washington, D. C."